Sept. 30, 1952 — F. J. MATHEWS — 2,612,300
LIQUID MEASURING APPARATUS
Filed Dec. 1, 1950
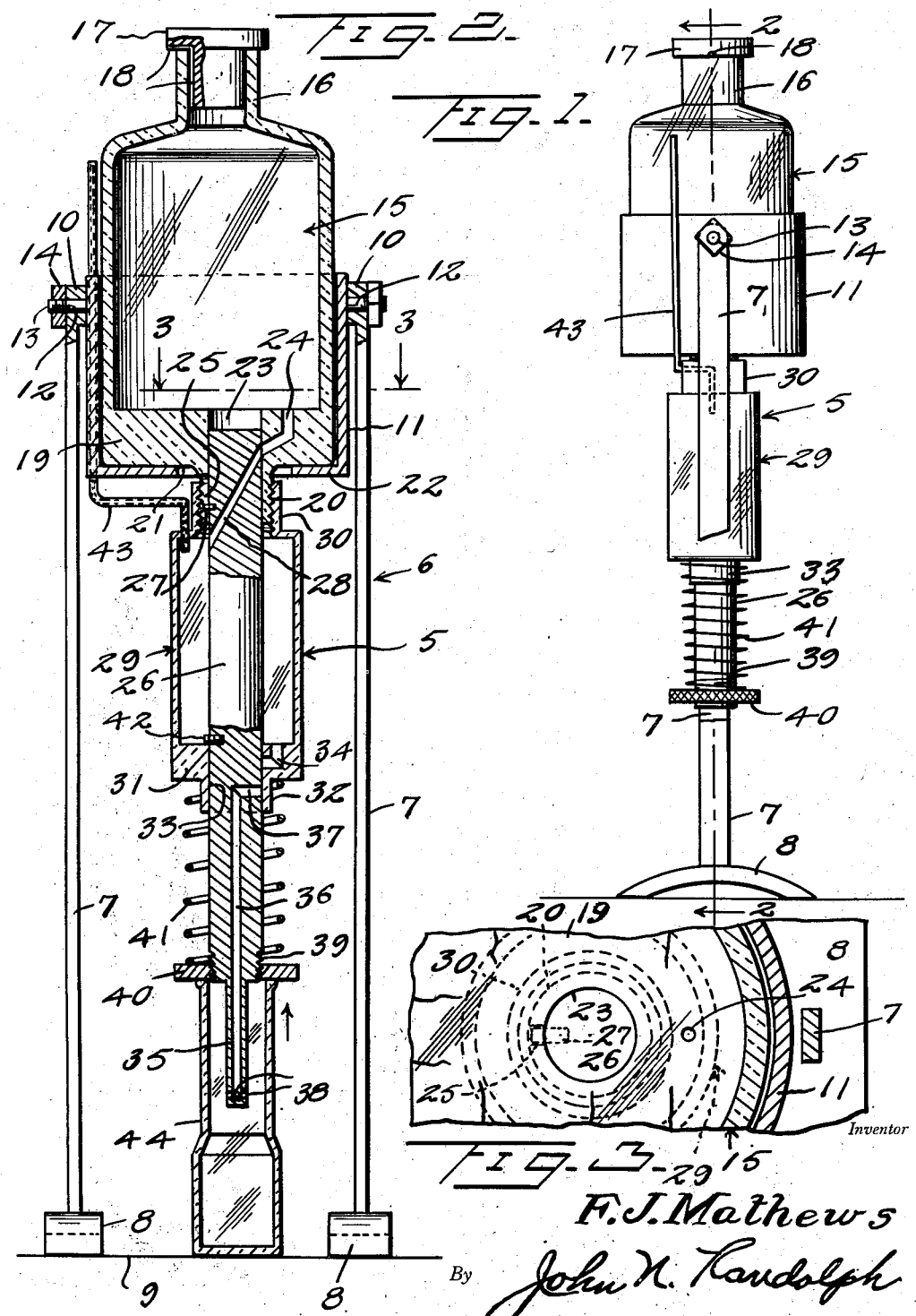
Inventor
F. J. Mathews
By John N. Randolph
Attorney Patented Sept. 30, 1952

2,612,300

UNITED STATES PATENT OFFICE 2,612,300

LIQUID MEASURING APPARATUS

Frank J. Mathews, Owatonna, Minn.

Application December 1, 1950, Serial No. 198,651

1 Claim. (Cl. 222—453)

This invention relates to an apparatus for use in measuring liquids such as acid and more particularly to an apparatus of extremely simple construction capable of being employed for accurately measuring desired quantities of a liquid and which is so constructed that it may be readily assembled and disassembled for the replacement of parts thereof and for varying the capacity of the apparatus.

Still a further object of the invention is to provide a measuring apparatus mounted for oscillating movement and so that a container may be readily positioned to receive a measured quantity of liquid discharged therefrom and thereafter readily removed from beneath the apparatus.

Various other objects and advantages of the invention will hereinafter become more fully apparent from the following description of the drawing, illustrating a presently preferred embodiment thereof, and wherein:

Figure 1 is a side elevational view of the measuring apparatus;

Figure 2 is an enlarged vertical sectional view, partly in side elevation thereof, and Figure 3 is an enlarged fragmentary horizontal sectional view of a portion of the apparatus.

Referring more specifically to the drawing, the liquid measuring apparatus in its entirety is designated generally 5 and includes a stand, designated generally 6, composed of a pair of corresponding supporting standards 7 each of which is provided at its lower end with an elongated foot 8 adapted to rest on a supporting surface 9 for supporting its standard in an upright position. Each standard 7 is provided at its upper end with an inwardly extending bearing 10. The bearings 10 are disposed in alignment and a cup-shaped holder 11 having an open top is disposed between the upper portions of the standards 7 and the bearings 10 and is provided with aligned outwardly projecting trunnions 12 which extend through and are journaled in the bearings 10 for supporting the holder between the standards 7 for rocking movement relatively thereto. The terminals of the trunnions 12 are threaded as seen at 13 to receive nuts 14 for detachably connecting the holder 11 to the standard 7 and which are adapted to be tightened sufficiently to maintain the standards 7 in upright positions but to permit the holder 11 to rock relatively thereto.

A storage container 15, such as a bottle or jar which is preferably formed of glass or other transparent material, is demountable supported in the holder 11 and extends upwardly from the open top thereof and is provided at its upper end with a filling neck 16 normally closed by a plug or stopper 17 which is provided with a vent passage 18. The jar or bottle 15 is of a proper cross sectional size and shape to fit into the holder 11 and is provided with a relatively thick bottom 19 having a depending externally threaded nipple 20 which extends downwardly therefrom through an opening 21 in the bottom 22 of the holder 11. The bottom 19 has a bore 23 extending therethrough and longitudinally through the nipple 20. Said bottom 19 is also provided with a passage 24 having a diagonal lower portion which opens into the bore 23 intermediate of its ends and an upper portion which is disposed substantially parallel to said bore 23 and which opens into the interior of the container 15. The nipple 20 is provided with an internal longitudinally extending groove 25 which opens into the bore 23 and which extends from the lower open end of said nipple upwardly preferably into a portion of the bottom 19.

An elongated rod 26 is sized to slidably engage in the bore 23 and is disposed in relatively snug fitting engagement therewith and with its upper end disposed in the upper portion of said bore 23 and above the upper end of the groove 25. A pin or key 27 projects radially from the rod 26 and slidably engages the groove 25 to key the rod to the container 15 to prevent it from rotating in the bore 23; however, if said rod and the bore 23 are of non-circular cross section the groove 25 and key 27 may be omitted. The rod 26, adjacent its upper end, is provided with a diagonal passage 28 extending thereacross and having an upper end disposed in one sliding position of the rod 26 to register with the lower, diagonal end of the passage 24. The key 27 and groove 25 cooperate to prevent turning of the rod 26 to thus insure registration of the passages 24 and 28 in one position of sliding movement of the rod 26.

A measuring container, designated generally 29, preferably formed of glass or other transparent material, is provided at its upper end with an internally threaded neck 30 which is threadedly connected to the nipple 20. The container 29 is provided with a relatively thick bottom 31 having a depending nipple 32. A bore 33 extends longitudinally through the nipple 32 and bottom 31 for slidably receiving a portion of the rod 26 which extends downwardly from the nipple 20 and longitudinally through the measuring chamber of the container 29. The bottom 31 is provided with an angular passage 34 one end of which opens into the bore 33 and the other end of which opens upwardly into the chamber of the container 29.

The rod 26 is provided with an externally restricted lower end 35. The lower portion of the rod 26 is provided with a longitudinally extending bore 36 having a radially extending upper end 37 which opens outwardly of the periphery thereof to register with one end of the passage 34 in one position of the rod 26 relatively to the measuring container 29. The bore 36 extends longitudinally through the restricted rod portion 35 to adjacent the lower end thereof. The rod portion 35 adjacent its lower, closed end is provided with a plurality, preferably four circumferentially spaced radially extending apertures or bores 38 which open outwardly of the rod portion 35 and which communicate with the bore 36 to form the discharge ports of the measuring apparatus 5.

The rod 26, directly above its restricted end 35, is externally threaded as seen at 39 to receive a nut or threaded collar 40 which is adjustably mounted thereon and which provides a seat for the lower end of an expansion coil spring 41. The spring 41 is disposed loosely around the lower portion of the rod 26, above the nut 40 and around the nipple 32 and has its upper end bearing against the container bottom 31 to urge the rod 26 downwardly relatively to the containers 15 and 29. A screw 42 is anchored in and projects radially from a portion of the rod 26 to form a stop adapted to engage the upper or inner surface of the container bottom 31 to limit the downward sliding movement of the rod 26 under the biasing action of the spring 41.

A vent tube 43 has a lower end extending into the upper portion of the container 29 adjacent its neck 30. Said end of the tube 43 is secured to the container 29 to provide a liquid and air tight seal around the tube. The tube 43 extends upwardly and outwardly from the container 29 and has a portion thereof extending upwardly adjacent a part of the side wall of the holder 11 and terminating and opening adjacent the upper portion of the storage container 15.

To assemble the measuring apparatus 5, the storage container 15 is positioned in the holder 11 and the rod 26 is then inserted downwardly through the measuring container 29, the neck 30 thereof being sufficiently large to permit the stop member 42 to pass therethrough. The upper end of the rod 26 is then inserted upwardly into the bore 23 and the pin 27 engaged in the groove 25. The storage container 15 together with the rod 26 may then be rotated to thread the nipple 20 into the neck 30. When the parts 20 and 30 are fully engaged the passage 28 will be positioned so that its upper end can be moved into registry with the lower end of the passage 24. The spring 41 is then applied to the lower portion of the rod 26 and beneath the container 29 and the nut or collar 40 is then threaded onto the threaded portion 39 to support and tension the spring 41 so that the rod 26 can be urged downwardly to position the stop 42 against the container bottom 31, in which position the upper end of the passage 28 will be in registration with the passage 24 and the lateral bore portion 37 below and out of registry with the passage 34. With the valve rod 26 thus disposed, the lower end of the passage 28 opens into the chamber of the measuring container 29 beneath its neck 30 so that a liquid, not shown, may flow from the storage container 15 through the passage 24 and the passage 28 into the chamber of the container 29 for filling this chamber. The vent tube 43 allows air to escape from the chamber 29 while it is thus being filled and the bore of the vent tube 43 is sufficiently small so that any liquid which may rise into said bore will be insufficient in amount to materially affect the quantity of liquid being measured and the portion of the tube bore disposed below the upper surface of the storage container bottom 19 may be included as a part of the chamber of the measuring container 29 in considering its capacity. The vent passage 18 in the stopper 17 vents the storage container 15 while the liquid is thus being dispensed therefrom. Accordingly, with the parts in their normal positions of Figure 2, the measuring container 29 will be filled from the storage container 15. The holder 11 and parts supported thereby may be swung in either direction on the trunnions 12 to permit a vial or container 44 to be positioned under the collar 40 and with the rod portion 35 extending into the vial 44, after which the parts may be returned to their upright positions of Figures 1 and 2. By then lifting upwardly on the vial or container 44 the rod 26 will be displaced upwardly to move the upper end of the passage 28 out of registry with the passage 24 to seal off the storage container 15 from the measuring container 29. This will also result in the lateral bore portion 37 being moved into registration with the passage 34 so that the contents of the measuring chamber 29 will flow by gravity through the bore 37, 36 and will be discharged from the ports 38 into the vial 44. The chamber 29 will be vented to the atmosphere by the vent tube 43 while its contents is thus being dispensed. It will also be noted that the groove 25 and pin 27 additionally function to prevent the rod 26 from turning so that the bore portion 37 may not be aligned with the passage 34. The vial 44 may then be removed from beneath the apparatus 5 and the spring 41 will return the parts to their positions of Figure 2 to close off the passage 34 and to return the passage 28 into registry with the passage 24 so that the chamber 29 can be refilled. The pin 27 additionally functions as a stop to limit the upward sliding movement of the rod 26 against the action of the spring 41 so that when the pin 27 engages the upper end of the groove 25 the bore portion 37 will be in registration with the passage 34.

Obviously, the size of the chamber 29 may be varied in cross section for measuring different quantities of a liquid and measuring chambers 29 having different capacities may thus be interchangeably employed with the other parts of the apparatus. Likewise, storage containers 15 of different lengths and therefore of different capacities may be utilized. Various other modifications and changes are likewise contemplated and may obviously be resorted to, without departing from the spirit or scope of the invention as hereinafter defined by the appended claim.

I claim as my invention:

A liquid measuring apparatus comprising a vented storage container having a depending nipple extending downwardly from the storage container bottom and having a bore extending therethrough, a vented measuring container having an upper end connected to the nipple and supported thereby beneath the storage container, said measuring container having a bottom provided with a bore disposed in alignment with the nipple bore, a rod extending through the measuring container having spaced portions slidably engaging the two bores, said storage container having a passage opening into the interior thereof and into the nipple bore, the measuring container having a passage opening into its interior and into the measuring container bore, said rod having a passage connecting the storage container passage and the measuring container and movable into and out of registration with the storage container passage, and said rod having a bore adjacent its lower end having an upper end disposed for movement into and out of registration with the measuring container passage and an opposite end opening outwardly of the rod below the measuring container, stop means limiting sliding movement of the rod and normally supporting the rod with its passage in registration with the storage container passage and with its bore out of registration with the measuring container passage whereby the measuring container is filled from the storage container by gravity flow, said rod being movable upwardly to move its bore into registration with the measuring container passage and to close the storage container passage whereby the contents of the measuring container will be dispensed by gravity from the discharge end of the rod bore.

FRANK J. MATHEWS.

REFERENCES CITED

The following references are of record in the file of this patent:

UNITED STATES PATENTS

| Number | Name | Date |
|---|---|---|
| 963,633 | Newland | July 5, 1910 |
| 1,909,454 | Brunner | May 16, 1933 |
| 2,093,365 | Ransom et al. | Sept. 14, 1937 |
| 2,455,962 | Wheeler et al. | Dec. 14, 1948 |

FOREIGN PATENTS

| Number | Country | Date |
|---|---|---|
| 17,962 of 1914 | Great Britain | July 29, 1914 |
| 53,839 | Denmark | Oct. 25, 1937 |